United States Patent
Wetterer et al.

(10) Patent No.: US 6,488,990 B1
(45) Date of Patent: Dec. 3, 2002

(54) PROCESS FOR PROVIDING COATINGS ON A METALLIC SURFACE

(75) Inventors: Sean M. Wetterer, Berkeley Heights, NJ (US); Lars Sebralla, Bruchköbel (DE); Manfred Walter, Linsengericht (DE)

(73) Assignee: Chemetall GmbH, Frankfurt am Main (DE)

( * ) Notice: Subject to any disclaimer, the term of this patent is extended or adjusted under 35 U.S.C. 154(b) by 0 days.

(21) Appl. No.: 09/684,271

(22) Filed: Oct. 6, 2000

(51) Int. Cl.[7] .............................. B05D 1/36; B05D 3/02; B05D 1/18; B05D 7/14; B05D 1/02

(52) U.S. Cl. ...................... 427/409; 427/318; 427/327; 427/407.1; 427/419.1; 427/421; 427/428; 427/430.1; 427/385.5; 148/243; 148/247; 148/250; 148/253; 148/275

(58) Field of Search ................................. 417/318, 327, 417/348, 353, 376.1, 385.5, 402, 409, 419.1, 421, 428, 430.1, 407.1; 148/243, 247, 253, 250, 275

(56) References Cited

U.S. PATENT DOCUMENTS

| | | | | |
|---|---|---|---|---|
| 5,277,709 A | * | 1/1994 | Armstrong et al. | 106/14.13 |
| 5,384,161 A | * | 1/1995 | Eisfeller et al. | 427/250 |
| 5,584,946 A | * | 12/1996 | Karmaschek et al. | 148/247 |
| 5,753,316 A | * | 5/1998 | Brent et al. | 427/486 |
| 5,985,046 A | * | 11/1999 | Serafin et al. | 148/243 |
| 6,057,001 A | * | 5/2000 | Schoonderwoerd et al. | 427/385.5 |

FOREIGN PATENT DOCUMENTS

WO     WO-98/29580 A1  *  7/1998

* cited by examiner

Primary Examiner—Michael Barr
(74) Attorney, Agent, or Firm—Fulbright & Jaworski L.L.P.

(57) ABSTRACT

Sequentially applying two different coatings, in two steps, to metallic surfaces. Metallic surfaces are contacted at temperatures from 10–100° C. with aqueous solution A and then with aqueous solution B, or vice versa, wherein solution A contains an effective amount of zirconium, hafnium, titanium, silicon and/or boron, and of fluoride as ions and/or complex ions able to pickle metallic surfaces and generate a coating on the pickled metallic surface and that solution B contains an effective amount of one or more of XYZ, $X^*Y^*Z^*$ and/or $X^*Y^*Z^*Y^*X^*$ where Y is an organic group with 2–50 carbons, where X as well as Z is a group—each same or different—of OH—, SH—, $NH_2$—, NHR—, CN—, $CH=CH_2$—, OCN—, CONHOH—, COOR', acrylamide-, epoxide-, $CH_2=CR''$—COO—, COOH—, $HSO_3$—, $HSO_4$—, $(OH)_2PO$—, $(OH)_2PO_2$—, (OH)(OR')PO—, $(OH)(OR')PO_2$—, $SiH_3$—, $Si(OH)_3$—, where R' is an alkyl group with 1–4 carbons, where R" is hydrogen or an alkyl group with 1–4 carbons, and where X and Z are each bound to the Y in their terminal position, where $Y^*$ is an organic group with 1–30 carbons, where $X^*$ as well as $Z^*$ is a group—each same or different—of OH—, SH—, $NH_2$—, NHR'—, CN—, $CH=CH_2$—, OCN—, CONHOH—, COOR', acrylamide-, epoxide-, $CH_2=CR''$—COO—, COOH—, $HSO_3$—, $HSO_4$—, $(OH)_2PO$—, $(OH)_2PO_2$—, (OH)(OR')PO—, $(OH)(OR')PO_2$—, $SiH_3$—, $Si(OH)_3$—, $N$—$CH_2$—$PO(OH)_2$—, —N—$[CH_2$—PO$(OH)_2]_2$— where R' is an alkyl group with 1–4 carbons, where R"is hydrogen or an alkyl group with 1–4 carbons.

31 Claims, No Drawings

PROCESS FOR PROVIDING COATINGS ON A METALLIC SURFACE

FIELD OF THE INVENTION

This invention relates to a process for forming a coating and an organic coating.

The invention is particularly concerned with at least two different coatings on metallic surfaces and preferably on aluminum, copper, iron, magnesium, zinc or of an alloy containing aluminum, copper, iron, magnesium and/or zinc.

BACKGROUND OF THE INVENTION

The term "conversion coating" is a well known term of the art and refers to the replacement of native oxide on the surface of a metallic material by the controlled chemical formation of a film on the metallic surface by reaction with chemical elements of the metallic surface so that at least some of the cations dissolved from the metallic material are deposited in the conversion coating. Other coatings are formed on the surface of the metallic material without or without significant deposition of constituents dissolved by chemical reactions with the metallic material.

In the search for alternative, less toxic coatings than chromium containing coatings, research has been conducted on non-conversion coatings and on conversion coatings based e.g. on zirconium and/or titanium as well as fluoride containing aqueous solutions instead of chromium bearing solutions.

However, there is considerable room for improvement in the adhesion and corrosion protection properties of prior titanium/zirconium-fluoride based coatings. The need for improvement is particularly true for coatings on certain metal alloys, such as 1000, 2000, 3000, 5000 and 6000 series aluminum alloys, which coatings can have variable adherence or no adherence.

Over the years there have been numerous attempts for the replacement of chromating chemicals by ones less hazardous to the health and the environment. Their major disadvantage is that they either form coatings with poor paint adhesion properties or there are working concentrations required showing a risk of blue discoloration which does not disturb performance but makes the process undesirable in the eyes of the users. Zirconium and titanium based coating processes have found some applications in certain market niches, but they have failed in the past 25 years to replace chromating as a pretreatment prior to painting especially of aluminum, magnesium, zinc or their alloys.

Accordingly, it is an object of the present invention to provide a surface treatment process for the surface of a metallic material which overcomes, or at least alleviates, one or more of the disadvantages or deficiencies of the prior art. It is also an object of the present invention to provide an aqueous, titanium/zirconium-fluoride containing coating solution for use especially together with a further organic coating or paint. Specifically, it was an object of this invention to propose such a process to suit industrial requirements of short time formation of the coating and of near-ambient operating temperature.

It has been discovered that the combination treatment of a titanium/zirconium-fluoride treatment with an application of self assembling molecules can greatly promote corrosion resistance and paint adhesion of the coating.

SUMMARY OF THE INVENTION

According to the present invention, there is provided a process of treating metallic surfaces showing at least two separate steps for applying two different coatings one after the other, whereby the metallic surfaces are contacted at a temperature in the range of from 10 to 100° C. first with an aqueous solution A and later on with an aqueous solution B or vice versa characterized in that the solution A contains an effective amount of zirconium, hafnium, titanium, silicon and/or boron as well as of fluoride in the form of ions and/or complex ions able to pickle the metallic surface and to generate a coating on the pickled metallic surface and that the solution B contains an effective amount of one or more compounds of the type XYZ, X*Y*Z* and/or X*Y*Z*Y*X*, where Y is an organic group with 2 to 50 carbon atoms, where X as well as Z is a group—each same or different—of OH—, SH—, $NH_2$—, NHR'—, CN—, $CH=CH_2$—, OCN—, CONHOH— (=hydroxamic), COOR' (=alkyl ester), acrylamide-, epoxide-, $CH_2=CR''$—COO—, COOH—, $HSO_3$—, $HSO_4$—, $(OH)_2PO$—, $(OH)_2PO_2$—, (OH)(OR')PO—, $(OH)(OR')PO_2$—, $SiH_3$—, $Si(OH)_3$—, where R' is an alkyl group with 1 to 4 carbon atoms, where R" is a hydrogen atom or an alkyl group with 1 to 4 carbon atoms, and where the groups X and Z are each bound to the group Y in their terminal position, where Y* is an organic group with 1 to 30 carbon atoms, where X* as well as Z* is a group—each same or different—of OH—, SH—, $NH_2$—, NHR'—, CN—, $CH=CH_2$—, OCN—, CONHOH— (=hydroxamic), COOR' (=alkyl ester), acrylamide-, epoxide-, $CH_2=CR''$—COO—, COOH—, $HSO_3$—, $HSO_4$—, $(OH)_2PO$—, $(OH)_2PO_2$—, (OH)(OR')PO—, $(OH)(OR')PO_2$—, $SiH_3$—, $Si(OH)_3$—, >N—$CH_2$—$PO(OH)_2$—, —N—$[CH_2$—$PO(OH)_2]_2$-where R' is an alkyl group with 1 to 4 carbon atoms, where R" is a hydrogen atom or an alkyl group with 1 to 4 carbon atoms.

DETAILED DESCRIPTION OF THE PREFERRED EMBODIMENTS

The process according to the invention may be characterized in that the metallic surfaces consist essentially e.g. of aluminum, copper, iron, magnesium, zinc or of an alloy containing aluminum, copper, iron, magnesium and/or zinc. p In the following it is not distinguished between the metallic surfaces and the already coated metallic surfaces, especially, if both possibilities may be possible at the same time, e.g. with reaction products and deposited compounds of the solution A not to make the text too complicate as the expert in the art knows what is meant. Furtheron, it is not distinguished by this term, if there is a very thin "natural" oxide and/or hydroxide layer. This oxide and/or hydroxide layer is typically extremely thin, mostly of few nm thickness. The solution A according to the invention may react chemically with the metallic surface by depositing cations in the coating being dissolved from the metallic material, but must not. Therefore, the coating is not generally called a conversion coating, although this may be in some cases a conversion coating.

Further on, it is preferred to have in the solution A concerning the fluoride content of the solution a high or very high percentage of complex fluoride and no or a low percentage of fluoride ions. In the case that in the same solution A titanium and zirconium would be present, it is preferred that the content of titanium is higher than the content of zirconium. On the other hand, it may be often preferred to have a content mainly or only of zirconium referring to chemical elements selected from the group of titanium, zirconium, hafnium, silicon and boron. Normally, no further additive is necessary for the use of solution A; in the case that a further additive is necessary, then surfactants, acids, or alkaline materials may be added. The coating formed by contacting the metallic surface may be a conversion or may be a non-conversion coating, depending on the type of metallic surface and on the contacting conditions. This coating is favorably located directly on the very thin oxide/hydroxide layer formed on the metallic surface or even directly on the metallic surface and contains often titanium, zirconium, hafnium, silicon and/or boron as well as hexafluoride and/or oxide/hydroxide. In the process according to the invention, the compounds of the type XYZ, X*Y*Z* and/or X*Y*Z*Y*X* used in the solution B may preferably show a group Y with 3 to 30 carbon atoms, more preferred with 4 to 20 carbon atoms, much more preferred with 4 to 16 carbon atoms, especially preferred with 9 to 14 carbon atoms as well as a group Y* with 2 to 24 carbon atoms, more preferred with 3 to 20 carbon atoms, much more preferred with 4 to 16 carbon atoms, especially preferred with 9 to 14 carbon atoms. It is preferred that the groups X* and Z* of the compounds of the type XYZ, X*Y*Z* and/or X*Y*Z*Y*X* are each bound to the group Y* in their terminal positions. In preferred embodiments, the compounds of the type XYZ, X*Y*Z* and/or X*Y*Z*Y*X* are able to form self assembling molecules which may form a layer, especially a thin layer or even a monolayer, of these self assembling molecules (SAM) on the metallic surfaces.

These compounds may show a group Y or Y* that is a linear unbranched group. Alternatively, these groups Y or Y* may be a linear group branched with at least one functional group, preferably branched with at least one alkyl group and/or one aromatic group. The functional groups may stand aside from the linear group.

The most effective constituent of the solution B may be a compound XYZ, X*Y*Z* and/or X*Y*Z*Y*X* with a group Y or Y* that has an even number of carbon atoms. Besides this most effective constituent which may have self assembling molecules there may be any surfactant in the solution B to improve the rate of deposition of self assembling molecules. Often compounds are used according to the process of the invention which may be able to form self assembling molecules and which may organize themselves parallel one to the other and in about perpendicular to the metallic surfaces with the hydrophobic regions of the molecules located at the metallic surfaces and with the hydrophilic regions of the molecules extending into the liquid away from the metallic surfaces. Nevertheless, there is no necessity that these compounds organize their molecules in such a way to generate coatings. There is the target to form a uniform coating quality as far as possible and an at least randomly distribution of islands of molecules of the solution B, but not the necessity of totally covering the metallic surfaces. Often even a very short exposure of the solution B to a metallic surface may lead to a random distribution of at least one of the compounds of the type XYZ, X*Y*Z* and/or X*Y*Z*Y*X*, nevertheless, sometimes a longer contacting time may be preferable for a high surface quality.

For the process according to the invention it is preferred that at least one compound of the type XYZ, X*Y*Z* and/or X*Y*Z*Y*X* is present in the aqueous solution as salt and/or acid.

The more effective constituents of the solution B may be compounds XYZ, X*Y*Z* and/or X*Y*Z*Y*X* with an unbranched straight-chain alkyl group with 3 to 30 carbon atoms as Y or Y*. Preferably, this group Y or Y* has 4 to 20 carbon atoms, more preferred 4 to 18 carbon atoms, much more preferred 5 to 14 carbon atoms and most preferred 10 to 14 carbon atoms.

In specific embodiments, the compound XYZ, X*Y*Z* and/or X*Y*Z*Y*X* may have as Y or Y* an unbranched straight-chain group consisting of 1 to 4 aromatic $C_6H_4$ nuclei connected in the para-position, or a group consisting of 1 or 2 unbranched, straight-chain alkyl residues each with 1 to 12 carbon atoms or 1 to 4 aromatic $C_6H_4$ nuclei connected in the para-position.

The most effective constituent of the solution B may be a compound XYZ, X*Y*Z* and/or X*Y*Z*Y*X* with a group Y or Y* that is an unbranched, straight-chain alkyl group with 6 to 14 carbon atoms or a p-$CH_2$—$C_6H_4$—$CH_2$-group or a p,p'-$C_6H_4$—$C_6H_4$-group.

The most effective constituent of the solution B may be a compound XYZ, X*Y*Z* and/or X*Y*Z*Y*X* with a group $(OH)_2PO_2$— or $(OH)(OR')PO_2$— as X or X*. The most effective constituent of the solution B may be a compound XYZ, X*Y*Z* and/or X*Y*Z*Y*X* with a group $(OH)_2PO_2$—, $(OH)(OR')PO_2$—, OH—, SH—, NHR'—, CH=$CH_2$ or $CH_2$=CR"—COO— as Z or Z*.

In preferred embodiments, the aqueous solution may contain at least one compound of the type XYZ, X*Y*Z* and/or X*Y*Z*Y*X* selected from the group of:

1-phosphonic acid-12-mercaptododecane,
1-phosphonic acid-12-(N-ethylamino)dodecane,
1 -phosphonic acid-12-dodecene,
p-xylylene diphosphonic acid,
1,10-decanediphosphonic acid,
1,12-dodecanediphosphonic acid,
1,14-tetradecanediphosphonic acid,
1-phosphoric acid-12-hydroxydodecane,
1-phosphoric acid-12-(N-ethylamino)dodecane,
1-phosphoric acid-12-dodecene,
1 -phosphoric acid-12-mercaptododecane,
1,10-decanediphosphoric acid,
1,12-dodecanediphosphoric acid,
1,14-tetradecanediphosphoric acid,
p,p'-biphenyldiphosphoric acid,
1-phosphoric acid-12-acryloyldodecane,
1,8-octanediphosphonic acid,
1,6-hexanediphosphonic acid,
1,4-butanediphosphonic acid,
1,8-octanediphosphoric acid,
1,6-hexanediphosphoric acid,
1,4-butanediphosphoric acid,
aminetrimethyleneposphonic acid,
ethylenediaminetetramethylenephosphonic acid,
hexamethylenediaminetetramethylenephosphonic acid,
diethylenetriaminepentamethylenephosphonic acid and
2-phosphonobutane-1,2,4-tricarboxylic acid.

In the process according to the invention the time of contacting the metallic surfaces with the solution. A may be in the range of from 0.001 seconds to 10 minutes. Applications in the coil industry may need contacting times in the range of from 0.001 seconds to 30 seconds, whereas other applications may often necessitate contacting times in the range of from 1 minute to 3 minutes. For the contacting of wheels, a time range of from 10 seconds to 5 minutes are preferred and of from 30 seconds to 2 minutes are more preferred. For the coil coating process, a contacting time range of from 0.002 to 20 seconds is preferred, of from 0.01 to 8 seconds is more preferred. For the contacting of singular metallic parts, a time range of from 10 seconds to 10 minutes is often preferred and of from 20 seconds to 6 minutes is more preferred. If the contacting time is very short, the percentage of the metallic surface being covered with at least one of the compounds of the type XYZ, X*Y*Z* and X*Y*Z*Y*X* may be relatively low and/or the molecules of these compounds may be not or only partially assembled. The longer the contacting time, the higher may be the percentage of metallic surface covered with at least one of these compounds. The longer the contacting time, the higher may be the percentage of molecules that are arranged perpendicular to the metallic surface as a reason of the self assembling effect. Although compounds of the type XYZ, X*Y*Z* and X*Y*Z*Y*X* with Y or Y* having 10 to 14 carbon atoms gave excellent results of corrosion inhibition and paint adhesion, it has been found that even in the cases that these compounds should not form a continuous coating on the metallic surface, but only a smaller or higher percentage of coating islands distributed on the metallic surface and/or that these compounds did not or only partially arrange perpendicular to the metallic surface, the such prepared coatings were astonishingly good concerning paint adhesion and corrosion inhibition.

The aqueous solution A may have a pH value in the range of from 1 to 5, preferably in the range of from of 2 to 4 and more preferred in the range of from 2.5 to 3.5 if the concentration of fluoride anions is in the range of from 10 to 1000 mg/L, but the pH value is preferably in the range of from 1 to 3 if the concentration of fluoride anions is in the range of 6,000 to 18,000 mg/L. At a lower pH value than 1, a suitable coating according to the invention will be generated, but normally significantly higher pH values will be used. At a pH value higher than 5, an instability of the solution A may occur in some cases; but if this instability does not occur due to the specific conditions, an acceptable coating will be created. The pH value may be adjusted within the regular coating process to values of e.g. 4.0 or 4.2 minimum, preferably by adding a fluoride containing compound, which may be in a water soluble form, to cut the pH value down to e.g. 4.2. The buffering of the solution A may be made favorably by any addition, e.g. of sodium fluoride or ammonium bifluoride.

The solution A may preferably be applied to the metallic surface at a temperature of up to 30° C. to avoid in every case blue discoloration of the coating. The solution B may preferably be applied to the metallic surface at a temperature of up to 60° C. The process according to the invention may be characterized in that in the solution A the concentration of the titanium is in the range of from 0.0001 to 0.1% by weight if titanium is added, the concentration of the zirconium is in the range of from 0.0001 to 0.1% by weight if zirconium is added, the concentration of the hafnium is in the range of from 0.0001 to 0.1% by weight as hafnium added intentionally, whereby only one selected from the group of titanium, zirconium, hafnium, silicon and boron has to be present. Instead of or together with at least one of the chemical elements of the group of titanium, zirconium and hafnium, silicon and/or boron may be used. The total amount of all the five chemical elements present in the solution may be in the range of from 0.0001 to 0.2% by weight. Preferably, the concentration of titanium, zirconium, hafnium, silicon and/or boron each may be in the range of from 0.0008 to 0.05% by weight, more preferred in the range of from 0.001 to 0.02% by weight. A mixture of at least two of them may be favorable to generate a combination effect with improved results, especially of the combination of titanium with zirconium. Furtheron, it is more preferred that the range of the concentration when used for spraying is of from 0.002 to 0.08% by weight of titanium, zirconium, hafnium, silicon and/or boron each, much more preferred of from 0.005 to 0.025% by weight. The solution A may contain $ZrOCl_2$ which may be very advantageous.

The concentration of the total fluoride may be in the range of from 0.001 to 0.2% by weight calculated as fluoride. The concentration of the total fluoride in the solution A may be preferably in the range of from 0.005 to 0.15% by weight, more preferred in the range of from 0.01 to 2% by weight, much more preferred of from 0.008 to 0.09% by weight. The moiety of complex fluoride anions at the total of the fluoride may be in the range of from 50 to 95%. If there is less titanium, zirconium, hafnium, silicon and/or boron in the solution A, then there will be less fluoride necessary; an excess of fluoride with regard to the content of titanium, zirconium, hafnium, silicon and/or boron enhances the pickling effect and may help to control the thickness of the generated coating. If there is a too high content of titanium, zirconium, hafnium, silicon and/or boron in the solution A in relation to the total fluoride content, then there will be a thicker coating which may disturb in some cases when a paint will be later applied upon as such a too thick coating may lead to filiform corrosion and a worse paint adhesion; furtheron, there may occur only a very weak pickling effect.

The aqueous solution A shows primarily a pickling effect, but even some deoxidation effect. Then a reaction to generating a coating may occur, which may for example contain hydroxides, oxides and other compounds of aluminum and/or other metallic elements that are constituents of the metallic material together with titanium, zirconium, hafnium, silicon and/or boron.

The coating containing titanium, zirconium, hafnium, silicon and/or boron may show a thickness in the range of from 0.1 to 100 nm. Its coating weight may be in the range of from 1 to 100 mg/m$^2$.

The coating containing one or more compounds of the type XYZ, X*Y*Z* arid/or X*Y*Z*Y*X* may show a thickness which is measured in the range of from 0.1 to 100 nm, often in the range of from 1 to 20 nm. Its coating weight may be often in the range of from 1 to 20 mg/m$^2$, but it may be even higher than 20 mg/m$^2$ or sometimes even in the range of about 80 or 120 mg/cm$^2$ as for cans and other containers. If the concentration of the solution B is significantly enlarged, the thickness of the generated coating often may remain in the same thickness range as applied with a much more diluted solution B.

The concentration of the solution B may vary in the range of from 0.00001 to about 50%, whereby the upper concentration limit is greatly dependent on the water solubility limit of the used compounds and the specific conditions. If compounds are used with relative short chain length of Y resp. Y* then the water solubility may be much enhanced. If the chain length of Y resp. Y* is in the range of from 10 to 14 carbon atoms, then the water solubility is reduced significantly and there may be a solubility limit of about 1%. This effect is proportional to the chain length and hydrophobicity of the hydrocarbon chain: The longer the hydrocarbon chain, the higher the hydrophobicity properties. Furtheron, the higher the concentration of these compounds in solution B, the greater may be the possibility to generate foam which is undesirable. For example, the dodecanediphosphonic acid may be dissolved in water without further aids in the range of from 100 to 300 mg/L, whereas it can be dissolved in hot water in an amount of up to 600 mg/L. For the amount of dodecanediphosphonic acid dissolved it may be an influencing factor, if the compound added is of low or of high purity. The amount of dissolved dodecanediphosphonic acid can be greatly enhanced by adding organic solvents. Such a proportion of an organic solvent may aid for quicker drying and may help to generate a higher concentration of the compounds of the type XYZ, X*Y*Z* and/or X*Y*Z*Y*X* in the solution B than without such organic solvent. Without any organic solvent, there are often only up to 400 mg/L of compounds of the type XYZ, X*Y*Z* and/or X*Y*Z*Y*X* in solution B, whereas with an organic solvent, its concentration can be enhanced up to a much higher extent.

It may be favorable, not to use any organic solvent. When an organic solvent is used, it may replace 0.01 to 50% of the water. This solvent may be an alcohol with 1 to 4 carbon atoms, acetone, dioxane and/or tetrahydrofurane.

It is preferred that the solution B contains essentially no further cations added intentionally. Furtheron, it is preferred that solution B contains essentially no nitrites, no nitrates and no peroxocompounds.

The water quality used for the preparation of solution B may be a water quality like natural water of very low hardness or like de-ionized water. The water quality shows preferably an electrical conductivity of less than 20 $\mu$S/cm, but in some cases values of less than 200 $\mu$S/cm may be sufficient.

Such a solution B containing only pure water and dodecanediphosphonic acid may show a pH value in the range of from 2.5 to 3.5. For the pretreatment of cans and other containers, a pH value in the range of from 0.5 to 2.5 may be preferred. Such a solution may show an electrical conductivity in the range of from 200 to 350 $\mu$S/cm, if the pure water used had an electrical conductivity of less than 20 $\mu$S/cm. The bath of the solution B may preferably be controlled with a photometer for the phosphorus and phosphate content or via measurement of the electrical conductivity. If the last mentioned method is used for controlling, the range of electrical conductivity may be held for dodecanediphosphonic acid in pure water in the range between 250 and 300 $\mu$S/cm. The solution B can be controlled and maintained very easily in a well workable state.

The pH values of the solution B may vary in the range of from 1 to 10, preferably in the range of from 1.5 to 5.5, more preferred for some of the applied compounds in the range of from 1.8 to 4, whereas for others having alkaline additives the preferred range may be of from 7 to 14, preferably in the range of from 8 to 12, more preferred in the range of from 9 to 11. Most of the phosphorus containing compounds of the solution B may be used with such low pH values as mentioned above first, but some may be used with a higher pH value. As further additives to solution B may be used e.g. any alcohol, any silane, any amine, any phosphate, any phosphonate, any surfactant, any organic acid or any mixture of these. These additives may be used as defoamers, stabilizers, wetting agents, corrosion inhibitors and/or hydrophobic agents.

The metallic surfaces may be contacted with the solution A and/or separately with the solution B by dipping, immersing, roll-coating, squeegeeing or spraying, each application type independent from the other for the solution A resp. B. For coil coating, all kinds of application may be used with the exception of dipping; for other applications all types of application may be used. If in the process of spraying the aqueous solution B considerable amounts of foam should occur, then an adjustment of the spray nozzle concerning the flood effect may be necessary. If spraying is used, it is favorable to minimize the formation of foams, e.g. by selection of an angle of about 45°; then there will be normally no addition of a defoamer necessary.

The time of contacting the metallic surfaces with the aqueous solution B may be selected from the range of I second to 10 minutes, preferably of 5 seconds to 5 minutes. Therefore, it may be used for coil coating applications having a need of contacting times in the range of from 1 to 30 seconds as well as for other applications where there may be contacting times in the range of from 1 minute to 3 minutes. The process according to the invention may be further varied by applying several coatings to generate a multilayer of organic and inorganic layers by applying e.g. solution B, then solution A, then solution B, then solution A and finally solution B again. The multilayer may have at least 3, preferably 5, favorably up to 12 of these layers. Such multilayers are preferably generated with a zirconium rich solution A. It has been detected that there is an interesting chemical interaction between phosphonic acid functional groups and zirconium which may react again with phosphonic acid functional groups and then with zirconium again, e.g. as zirconyl chloride.

The process according to the invention may be started by subjecting the metallic surfaces to cleaning and/or degreasing before applying the first of the aqueous solutions A resp. B to the metallic surfaces. The cleaning and/or degreasing may be done with the help of conventional alkaline cleaners or solvent cleaners or acidic cleaners or cleaner mixtures. This cleaning and/or degreasing is only necessary if the solution B is the first applied aqueous pretreatment/treatment solution, as the solution A is often as acidic that a cleaning and/or degreasing before applying the solution A is favorable, but not necessary. In both cases, it is preferable to use after cleaning and/or degreasing a deoxidation step which may be carried out by contacting the metallic surfaces with an acidic solution typically with a pH value of up to 3 and which may contain any fluoride. On the other hand, the metallic surface may be cleaned and pickled or only pre-annealed before contacting it with one of the solutions A or B.

If the solution A is the first of the two applied solutions A and B, then there may be a cleaning, rinsing, pickling and one or two times rinsing before applying solution A as may be useful for the pretreatment of wheels. If the solution B is the first of the two applied solutions A and B, then there may be a cleaning and one or two times rinsing before applying solution B as may be useful for the pretreatment of wheels or a cleaning, rinsing, pickling and one or two times rinsing before applying the solution B as may be useful for the pretreatment/treatment of cans or other containers. Preferably, in between any of the process steps and the next following process step of contacting with a reactive liquid there is at least one rinsing with water. In most of the steps, especially after cleaning and/or degreasing, tap water may be used for rinsing, but after the deoxidation as well as after contacting with the solutions A resp. B, de-ionized water is preferred. After the coating with the solution B, there is no necessity to rinse the metallic surfaces, as the unreacted material will not impair paint or other materials adhesion being applied to the coated surfaces later on. The coated metallic surfaces may be dried and/or the excess liquid may be blown away after having been coated with. the solution B. The solution B may therefore be applied in a no rinse method. There should be a rinsing in between contacting the metallic surfaces with the solution A and contacting them with the solution B. This is preferred to avoid drag in of the solution A into the solution B as there may be the risk of reaction of both solutions one with the other, causing precipitation and reducing the concentration of active compounds. In the case that first the solution B is applied and afterwards the solution A, it is preferable to have a rinsing in between because of the same reason, but it is not necessary because of the very small concentration of the effective ingredients of the dragged in liquid into the bath of the solution A. Alternatively, the excess liquid of the solution B could be dried or blown away instead of a rinsing. On the other hand, the drying of excess liquid of the solution A instead of a rinsing may be disadvantageous as there may be a decomposition or damage of the possibly later on applied paint or any other similar layer because of a possible reaction of the residue and the subsequently applied layer.

The metallic surfaces coated with the reaction products and deposited compounds of the solution A resp. B may then be coated with a lacquer, a paint, an adhesive, an after rinse, a sealing, a rubber and/or an organic material, especially with a polymeric material. The rubber layer may be useful for a metal to rubber bonding.

It is preferable that first the solution A is applied and then afterwards the solution B. But it may be favorable, too, first to apply the solution B and then the solution A. In this case, the coating as applied with the solution B may be partially or even only to a very small amount dissolved by applying the solution A. Furtheron, if the afterwards applied coating of the solution A should be thicker, the favorable effect of self assembling molecules will decrease or will be hindered and the advantages of this coating in contact with the later thereon applied layer of a paint or any other polymer containing coating will be reduced. If the coating applied with the solution A should be thin, this favorable effect may be partially or even essentially maintained. If the solution A should show a low or very low concentration, the coating applied by this solution will be quite thin. The combination process according to the invention combines the benefits of two treatments together: The solution A provides coatings which provide excellent corrosion protection by inorganic passivation of the surface. The solution B provides organic coatings, sometimes as monolayers, which create a hydrophobic barrier and also promote excellent paint adhesion. The use of both pretreatments result therefore in complementary protection of the metallic surface. Furtheron, the organic molecules of the compounds of the type XYZ, X*Y*Z* and/or X*Y*Z*Y*X* are reactive especially to zirconium.

The applied coatings are very suitable for applying a lacquer, a paint, an adhesive, an after rinse, a sealing, a rubber and/or an organic material, especially a polymeric material because of excellent adhesive strength, homogeneity of the surface and good reactivity to the functional groups of these further on applied coatings.

The metallic surfaces going to be coated according to the process of the invention may be such of castings, extruded parts, forgings, frames, housings, profiles, sheet stock, small parts, stampings, strips, wheels, wires, parts for aircraft industry, for apparatuses, for automobile industry, for beverage and other containers like cans, for construction or for mechanical engineering.

EXAMPLES

The following examples illustrate, in detail, embodiments of the invention. The following examples shall help to clarify the invention, but they are not intended to restrict its scope:

Substrates

1. Panels of aluminum alloy 6061, an alloy which is generally used in a certain percentage for sheets and for which corrosion testing results may be compared with results on an aluminum alloy A356 as used for castings like wheels.
2. Further on, testing was conducted on wheels resp. wheel sections of aluminum alloy A356. Two types of wheel sections were also used: "as-cast" which have a rough finish and generally more oxides on the surface and "machine-finished" which have been further processed by milling to obtain a bright surface.
3. Panels of 3003 aluminum alloys.

Process

The sheets as well as sections of wheels were coated using a standard process sequence for pre-treatment and after-treatment; the process is shown in Table I. The cleaning is done by spray application of an aqueous, non-etching, silicate-free alkaline cleaner, Oakite® Aluminum Cleaner NSS of Chemetall Oakite Inc.; the pH value of the bath solution was 9.0 after make up. As a deoxidizer for these alloys which contain small amounts of copper (<0.4%) and relatively low amounts of silicon (<7.5%), a hydrofluoric/sulfuric acid mixture, Oakite® 27-AA-15 of Chemetall Oakite Inc. was used at a total concentration of 0.4 mol/l of free acid. The coating stages were either performed by spraying or immersing to generate two sets of data—with the exception of the chromating solution which was only applied by immersing.

(Oakite® is a registered trademark of Chemetall Oakite Inc., Berkeley Heights, N.J., U.S.)

TABLE I

Process Sequence

| Step | Process | Chemicals, Equipment | Concentration [g/L] | Temperature [° C.] | Time [sec] |
|---|---|---|---|---|---|
| 1 | Alkaline Cleaning | Aluminum Oakite ® Cleaner NSS | 30 to 50 | 55 | 120 |
| 2 | Rinsing | Tap water | | ambient | 30 |
| 3 | Deoxidizing | Oakite ®¹/-27-AA-15 | 50 | ambient | 90 |
| 4 | Rinsing | Tap water | | ambient | 30 |
| 5 | Rinsing | De-ionized water | | ambient | 10 |
| 6 | Coating with solution A | See specific examples | | | |
| 7 | Rinsing | De-ionized water | | ambient | 30 |
| 8 | Coating with solution B | See specific examples | | | |
| 9 | Rinsing | De-ionized water | | ambient | 30 |
| 10 | Drying | Oven | | 50 | 300 |

In the comparative examples 1 to 3, which employ only one coating solution, the process as shown in Table I was only partially used, but as far as possible. In example 4, the complete process was used as shown in Table I. Solutions referred to in the examples are further described in a subsequent section.

Example 1

Chromating

A chrome conversion coating was applied by immersion in Solution 1—which is a solution of type A—for 90 seconds at 35° C. After rinsing, the panel was dried before the presence of the chrome conversion coating was confirmed by x-ray fluorescence spectroscopy.

Example 2

Application of Solution A without the Subsequent Application of Solution B

A titanium/zirconium coating was applied by either immersion or spray application of Solution 2—which is a solution of type A—for 90 seconds at ambient temperature. After rinsing, the panel was dried before the presence of the coating was confirmed by checking the appearance of the part for a faint iridescent luster, indicative of homogenous formation of the coating.

Example 3
Application of Solution B without Prior Application of Solution A

A phosphonic acid coating was applied by either immersion or spray application of Solution 3—which is a solution of type B—for 90 seconds at ambient temperature. After rinsing, the panel was dried and the presence of the coating was confirmed by contact angle measurement.

Example 4
According to the Invention: Application of Solution A Prior to Solution B After formation of the first coating by either spray or immersion application of Solution 2—which is a solution of type A—for 90 seconds at ambient temperature, the coated substrates were rinsed without drying. (Additional substrates were prepared and dried after rinsing in order to visually confirm the presence and homogeneity of the coating. In this way, it was possible to verify the formation of the first coating without interrupting the process.) Then Solution 3—which is a solution of type B—was applied to the already coated substrates for 30 seconds at ambient temperature. Individual substrates were exposed to both Solutions 2 and 3 in the same manner (either by immersion or by spray). The appearance of the twice coated substrates did not change after application of the second coating. The quality of the second coating was evaluated by contact angle measurements and further tested after painting by adhesion testing of the painted substrates.

Solutions

Solution 1 for the Comparative Example 1: Chromating
The coating solution 1—which is a solution of type A—was prepared by dissolving 30 g/L of Oakite® 27-GD-5 (a concentrated product for the formation of chromium conversion coatings) in de-ionized water, and potassium hydroxide was added until the level of the pH value of 3.0 was reached. This corresponds to a chromic acid concentration of 1.1 g/L.

Solution 2 for the Comparative Example 2: Application of Solution A without the subsequent application of Solution B
The coating solution 2—which is a solution of type A—was prepared by dissolving hexafluorozirconic acid and hexafluorotitanic acid in de-ionized water until reaching a zirconium concentration of 0.016% by weight, a titanium concentration of 0.043% by weight and a fluoride concentration of 0.12% by weight. In solution, the fluoride was largely present as complexed hexafluoride. The pH value of the solution was adjusted to 3.0 with ammonium hydroxide.

Solution 3 for the Comparative Example 3: Use of Solution B without prior application of Solution A
The coating solution 3—which is a solution of type B—was prepared by dissolving 0.33 g of dodecane-diphosphonic acid per liter of de-ionized water which resulted in a pH value of 3.6.

Preparation of Solution 2 and of Solution 3 for use in the dual-stage process in Example 4 according to the invention: Application of Solution A prior to Solution B
The coating solution 2—which is a solution of type A—was prepared by dissolving hexafluorozirconic acid and hexafluorotitanic acid in de-ionized water until reaching a zirconium concentration of 0.016% by weight, a titanium concentration of 0.043% by weight and a fluoride concentration of 0.12% by weight. In solution, the fluoride was largely present as complexed hexafluoride. The pH value of the solution was adjusted to 3.0 with ammonium hydroxide.

The coating solution 3—which is a solution of type B—was prepared by dissolving 0.33 g of dodecane-diphosphonic acid per liter of de-ionized water which resulted in a pH value of 3.6.

Preparation of Solution 2, Solution 3, Solution 4, and Solution 5 for the use in a dual-stage process in Comparative Example 7: Application of Alternative Solution. A's prior to Application of Solution B
The coating solution 2—which is a solution of type A—was prepared by dissolving hexafluorozirconic acid and hexafluorotitanic acid in de-ionized water until reaching a zirconium concentration of 0.016% by weight, a titanium concentration of 0.043% by weight and a fluoride concentration of 0.12% by weight. In solution, the fluoride was largely present as complexed hexafluoride. The pH value of the solution was adjusted to 3.0 with ammonium hydroxide.

The coating solution 3—which is a solution of type B—was prepared by dissolving 0.33 g of dodecane-diphosphonic acid per liter of de-ionized water which resulted in a pH value of 3.6.

The coating solution 4—which is a solution of type A—was prepared by dissolving hexafluorozirconic acid and sulfuric acid in de-ionized water until reaching a zirconium concentration of 0.015% by weight, a sulfate concentration of 0.048%, and a fluoride concentration of 0.019% by weight. In solution, the fluoride was largely present as complexed hexafluoride. The pH value of the solution was adjusted to 3.0 with ammonium hydroxide.

The coating solution 5—which is a solution of type A—was prepared by dissolving hexafluorozirconic acid and an acrylic resin in de-ionized water until reaching a zirconium concentration of 0.015% by weight, a polymer concentration of 0.2% by weight, and a fluoride concentration of 0.04% by weight. In solution, the fluoride was largely present as complexed hexafluoride. The pH value of the solution was adjusted to 3.0 with ammonium hydroxide.

Preparation of Solution 3 and of Solution 6 for the use in the dual stage process in Example 10 and 11 according to the invention as well as for the comparison Example 12 and also in a multilayer process in Example 13 according to the invention:
The coating solution 3—which is a solution of type B—was prepared by dissolving 0.33 g of dodecane-diphosphonic acid per liter of de-ionized water which resulted in a pH value of 3.6.

The coating solution 6—which is a solution of type A—was prepared by dissolving 1.00 g of zirconyl chloride ($ZrOCl_2$) per liter of de-ionized water. This solution had a pH value of 3.0.

Results

The coatings were judged for iridescent appearance, for complete coverage, and for uniformity. The coating weight was analyzed for the TiZr content by X-ray fluorescence analysis using samples for calibration of the same alloys with a known Ti and Zr content on the surface.

All sections were powder painted with 3.0 to 3.5 mil of Ferro VP-188 clearcoat polyester powder paint. 24 hours after painting, parts were scribed in the face and window region of the section and installed into a CASS chamber for 240 hour exposure to Copper-Accelerated Acetic Acid-Salt Spray Testing according to CASS DIN 50021. The performance was determined by total creepage, a measure of paint debonding and corrosion development, reported in Table II in millimeters.

TABLE II

Results of CASS testing in millimeters.

| Example | 1 (comp.) | 2 (comp.) | 3 (comp.) | 4 (invention) |
|---|---|---|---|---|
| by immersion | 3.00 | 3.20 | 3.16 | 2.83 |
| by spray | — | 3.39 | 3.75 | 3.04 |

The performance data of Table II indicate that there is a combination effect of both treatments according to the invention. The CASS test as used is a standardized test procedure especially for the corrosion inhibition of wheels and is very significant for the quality of the results. The results for immersed substrates as well as the results for sprayed substrate show significantly better data for the process according to the invention, when there was a first coating with a solution of type A and then a second coating with a solution of type B. All these data were gained with considerable diligence. Therefore, the process 4 according to the invention as far as applied by immersion should be significantly better than the typical chromating process as normally used.

Furtheron, all aluminum alloy sheet panels were tested with the Impact Test, ECCA T5 with 20 inch-pounds; the results were okay for the use of solutions 2 and 3 together. All aluminum alloy sheet panels were tested with Accelerated Outdoor Exposure Test with Common Salt in accordance to VDA test sheet 621-414; the results were below 1 mm for all examples according to the invention.

All aluminum alloy sheet panels were tested with Filiform Corrosion Test over 3000 hours in accordance to DIN EN 3665; the results were maximum lengths below 1 mm for all examples according to the invention. For the comparison examples 2 and 3, the results varied in the range of from 1 to 2 mm.

All aluminum alloy sheet panels as well as wheel sections were tested with Cross Hatch Test in accordance to DIN EN ISO 2409; the results were Gt=0 lengths for all examples according to the invention. For the comparison example 2, the results varied at about Gt=1.

Typically, sections of wheels as well as parts made of aluminum alloys show after more than 1000 h CASS values<1 mm and after more than 1000 h Salt Spray Test values< 1 mm.

Further Experiments for Optimization and Comparison

Example 5
Variation of the pH Value of the Solution of the Type A

Additional panels of AA 6061 were prepared using the process according to the invention as described above in example 4. For these substrates, the pH of Solution 2—which initially contained 0.016% by weight of zirconium, 0.043% by weight of titanium, and a fluoride concentration 0.12% by weight—was adjusted by the addition of small quantities of ammonium hydroxide. The composition of Solution 3 was not modified for this set of panels. After application of both solutions and painting as previously described, the panels were scribed and exposed to CASS solution for 240 hours in accordance with CASS DIN 50021. The total creepage which developed is reported in Table III.

TABLE III

Results of CASS testing of pH series of panels

| pH value | 1.5 | 2.0 | 2.9 | 5.5 |
|---|---|---|---|---|
| creepage [mm] | 1.75 | 1.00 | 1.00 | 1.75 |

Table III indicates that there is an optimum of corrosion inhibition if a pH value in a range about 2.0 and 2.9 is used.

Example 6
Variation of the Concentration of the Solution A

In a similar series of tests as in example 5, the concentration of Solution 2 was varied while the pH value was maintained in the range of 3.0 to 3.5 with specific additions of ammonium hydroxide. The concentration of Solution 2 which is indicated in Table IV will be reflected in a proportional dilution of the content of zirconium, titanium, and fluoride in comparison to the neat solution. The composition of Solution 3 was not modified for this set of tests. Machine-finished wheel sections were prepared using the process described in Example 4, and painted and scribed as described previously. After 240 hour exposure to CASS in accordance to CASS DIN 50021, the wheel sections were evaluated and total creepage (mm) is reported in Table IV.

TABLE IV

Results of CASS testing of Solution 2 concentration series.

| concentration [%] | 7.1 | 14.3 | 28.6 | 71.4 | 100.0 |
|---|---|---|---|---|---|
| creepage [mm] | 1.5 | 2.0 | 2.0 | 2.0 | 2.5 |

Table IV indicates that very low concentrations of Solution 2 may be preferable.

Example 7
Comparison with Comparable Coatings

A series of wheel sections were treated with a variety of solutions which contain at least zirconium and fluoride in common. Solution 2 was diluted with de-ionized water such that it contained 0.012% by weight titanium, 0.004% by weight zirconium and 0.034% by weight fluoride, Solution 4 contained 0.015% by weight zirconium and 0.019% by weight fluoride with additional sulfate, and Solution 5 contained 0.015% by weight zirconium and 0.04% by weight fluoride with additional polymer in solution. Sections were processed according to the invention as described above in Example 4 using Solution 3 as Solution B. After painting with the same paint as described previously and scribing, CASS performance was evaluated by measuring creepage (in mm) after 240 hour exposure of the parts to Copper-accelerated Acetic Acid-Salt Spray testing according to CASS DIN 50021.

TABLE V

Results of CASS testing of Solution A Variation Series

| Solution | 2 | 4 | 5 |
|---|---|---|---|
| Concentration* [%] | 0.016 | 0.015 | 0.015 |
| creepage [mm] | 1.5 | 2.0 | 1.5 |

*of the sum of titanium and zirconium

The data of Table V seem to describe that alternate compositions of the solution used as Solution A in the process as described in Example 4 may be appropriate as long as the solution meets the compositional requirements as described previously.

Example 8

Variation of the Concentration of the Solution B

A series of panels of 6061 AA were treated as described in Example 4 with a sample of Solution 2 which had been diluted with deionized water such that it contained. 0.0061% of titanium, 0.0022% of zirconium and 0.017% of fluoride. For Solution B, a sample of Solution 3 was modified with a series of dilutions with deionized water such that the resulting total concentration of phosphonic acids in solution was decreased from 1 mM to 0.001 mM. Although the majority of phosphonic acids present were 1,12-dodecanediphosphonic acid, impurities and isomers may also have been present. Parts were painted with the same paint as described previously, scribed, and exposed to CASS for a 240 hour exposure in accordance with CASS DIN 50021. Panels were than evaluated for corrosion performance by measuring creepage (in mm).

TABLE VI

Results of CASS testing of Solution B Concentration Series

| Concentration [mM]* | 1 | 0.5 | 0.1 | 0.05 | 0.01 | 0.005 | 0.001 |
|---|---|---|---|---|---|---|---|
| pH value | 3.6 | 4.0 | 4.6 | 4.9 | 5.5 | 5.7 | 5.9 |
| creepage [mm] | 2.5 | 2.5 | 2.5 | 2.0 | 2.5 | 2.5 | 2.5 |

*total of the phosphonic compounds

The data of Table VI vary only slightly, but seem to indicate a minimum at about 0.05 mM of diphosphonic compounds in Solution B.

Example 9

Variation of the Type of Phosphonic Compounds and their Concentration

Wheel sections were treated using the process as described in Example 4 with a sample of solution 2 which had been diluted with deionized water such that it contained 0.0061% by weight titanium, 0.0022% by weight zirconium, and 0.017% of fluoride. Then one of a series of solutions were applied which either contained 1 mM dodecanephosphonic acid, or either 0.01%, 0.1%, or 1.0% aminotri (methylene phosphonic acid), or either 0.01%, 0.1%, or 1.0% 2-phosphonobutane-1,2,4-tricarboxylic acid. After painting with the same paint as described previously and scribing, CASS performance was evaluated by measuring creepage (in mm) after 240 hour exposure according to CASS DIN 50021. For comparison, wheel sections were also prepared by chromating as in Comparative Example 1, painted and tested. Additional sections were also prepared by cleaning and deoxidizing but with no further processing other than a deionized water rinse prior to painting and testing.

TABLE VII

Results of CASS testing of Solution B Variation Series

| Final Processing | DI Rinse only (Comparative) | Chromate (Comparative) | 1,12-dodecane diphosphonic acid | Amino tri (methylene phosphonic acid) |
|---|---|---|---|---|
| Conc. [%]* | 0 | 0.0011 | 0.03 | 0.01 |
| pH value | 6.9 | 3.0 | 3.6 | 4.0 |
| Creep [mm] | 4.0 | 3.0 | 2.0 | 2.0 |

| Final Processing | Amino tri(methylene phosphonic acid) | Amino tri(methylene phosphonic acid) | 2-phosphonobutane-1,2,4-tricarboxylic acid | 2-phosphonobutane-1,2,4-tricarboxylic acid | 2-phosphonobutane-1,2,4-tricarboxylic acid |
|---|---|---|---|---|---|
| Conc. [%]* | 0.1 | 1.0 | 0.01 | 0.1 | 1.0 |
| pH value | 3.3 | 2.4 | 4.0 | 3.4 | 2.8 |
| Creep [mm] | 2.0 | 4.0 | 1.5 | 1.5 | 2.5 |

*weight percentage of phosphonic acids or chromium

The data of Table VII show that all of the phosphonic solutions result in better corrosion resistance than the comparative chromium application. The use of 2-phosphonobutane-1,2,4-tricarboxylic acid gave the best results of all tests.

All test results gave significantly better results when coatings with solution A and with solution B were applied than with solution B alone.

Examples 10 to 12

Variation of the Order of the Solutions A and B as Well as Omission of Solution A For the examples 10 to 12, the cleaning and deoxidation sequence of Table I was used. The cleaning was done by spray application of an aqueous, non-etching, silicate-free alkaline cleaner, Qakite® Aluminum Cleaner NSS of Chemetall Oakite Inc.; the pH value of the bath solution was 9.0 after make up. As a deoxidizer for these alloys which contain small amounts of copper (<0.4%) and relatively low amounts of silicon (<7.5%), a hydrofluoric/sulfuric acid mixture, Oakite® 27-AA-15 of Chemetall Oakite Inc. was used at a total concentration of 0.4 mol/l of free acid. In examples 10 to 12, all processing was performed by immersion.

For example 10 according to the invention, first Solution 6 was applied as Solution A to panels of aluminum alloy 3003 for 90 seconds at ambient temperature. Following a DI rinse, Solution 3 was applied as Solution B. For example 11 according to the invention, first Solution 3 was applied as Solution B and afterwards Solution 6 was applied as solution A. For comparison example 12, only Solution 3 was applied to panels as Solution B with no subsequent exposure to any Solution A. All prepared substrates were painted after a DI rinse and drying as described previously, scribed and installed for 168 hr exposure to CASS. The following maximum creepage was recorded:

TABLE VIII

Results of CASS testing of Sequence Variation Trials.

| example | 10 (invention) | 11 (invention) | 12 (comp.) |
|---|---|---|---|
| CASS [mm] | 2.0 | 2.0 | 5.0 |

The results indicate that the order of the solutions A and B may be exchanged, but that the use of a solution B alone may be significantly worse than the combination treatment of the solutions A and B.

Multilayer Experiments

Example 13

Variation of the Number of Layers of the Multilayer

A molybdate reagent solution which turns blue upon contact with aluminum was applied to panels of 6061 aluminum alloy treated with monolayers (P resp. P-Z) and bilayers (P-Z-P resp. P-Z-P-Z). Panels had been alternately treated at ambient temperature with phosphonates by immersion in Solution 3 and zirconium ions by immersion in Solution 6 separated by DI rinses. Generally, the solution will turn blue instantly on untreated panels. Here, the monolayers turned blue after 15 minutes and the bilayers after 20 minutes of contact with the molybdate reagent solution. This experiment indicates that the permittivity of the coating formed by a multilayer treatment is less than that of formed by a monolayer treatment. As total exposure time to coating solutions was kept constant for all prepared substrates, the reduced permittivity is attributed to multilayer formation, not just densification of a monolayer structure on the surface. This reduced permittivity has implications for the transport of water, ions, and other corrosive agents to the surface which is reflected in corrosion test data presented below.

Humidity testing of unpainted panels in accordance with ASTM standard D1735 was performed demonstrating the anti-corrosive benefit of multilayer applications of phosphonic acid and zirconium salt solutions. Panels of 6061 aluminum alloy were prepared by application of phosphonate by immersion in Solution 3 or by application of zirconium by immersion in Solution 6 separated by DI rinsing for 30 seconds. In the following, the numbers in the center column describe the contacting time in minutes for each immersion, the numbers in the right column show the relative performance quality with "1" for the best outcome:

TABLE IX

Relative Humidity Trial Performance of Monolayers and Bilayers

| Coating | Sequence | Relative Performance |
| --- | --- | --- |
| Monolayer | 5 minutes | 6 |
| Monolayer | 2 minutes | 5 |
| Bilayer | 2-2-2 minutes | 4 |
| Bilayer | 2-5-5 minutes | 3 |
| Bilayer | 2-2-5 minutes | 2 |
| Bilayer | 5-5-5 minutes | 1 |

Panels of aluminum alloy 6061 were also prepared to perform CASS testing per CASS DIN 50011 and GM Filiform testing per GM standard 9682P. Panels were immersed at ambient temperature either for 3 minutes in Solution 3 to produce a monolayer or for a sequence of 1 minute in Solution 3 followed by 1 minute in Solution 6 followed by 1 minute in Solution 3 (separated by 30 second DI rinses) to produce a bilayer. Panels were painted as described before, scribed, and installed into testing. For the CASS testing, the total average creepage after 168 or 336 hours exposure is reported in millimeters; however, for the filiform testing the maximum filament length which developed after 4 week exposure is reported below in Table X:

TABLE X

CASS and F liform Test Performance of Monolayers and Bilayers

| | Sequence | 168 h CASS | 336 h CASS | Fillform |
| --- | --- | --- | --- | --- |
| Monolayer | 3 minutes | 1.50 | 3.00 | 0.75 |
| Bilayer | 1-1-1 minutes | 0.92 | 1.00 | 0.25 |

These tests show that a bilayer, formed of two layers of phosphonic acid linked by transition metal ions, offer better corrosion protection than a monolayer developed for comparable exposure times.

What is claimed is:

1. A process for treating a metallic surface having at least two separate but sequential steps for applying two different coatings, including contacting said metallic surface with aqueous solution A and then with aqueous solution B, or with aqueous solution B and then with aqueous solution A, at a temperature in the range of from 10 to 100° C., wherein solution A contains an amount of zirconium, hafnium, titanium, silicon and/or boron, and an amount of fluoride in the form of ions and/or complex ions, capable of pickling the metallic surface and generating a coating on the pickled metallic surface, and wherein solution B contains an effective amount of one or more compounds of the type XYZ, X*Y*Z* and/or X*Y*Z*Y*X* where Y is an organic group with 2 to 50 carbon atoms,
X and Z are each the same or different and are selected from the group consisting of OH—, SH—, $NH_2$—, NHR'—, CN—, $CH=CH_2$—, OCN—, CONHOH—, COOR', acrylamide-, epoxide-, $CH_2=CR''$—COO—, COOH—, $HSO_3$—, $HSO_4$—, $(OH)_2PO$—, $(OH)_2PO_2$—, $(OH)(OR')PO$—, $(OH)(OR')PO_2$—, $SiH_3$—, and $Si(OH)_3$—, R' is an alkyl group with 1 to 4 carbon atoms,
R" is a hydrogen atom or an alkyl group with 1 to 4 carbon atoms, and X and Z are each bound to Y in their terminal position, Y* is an organic group with 1 to 30 carbon atoms, and X* and Z* are each the same or different and are selected from the group consisting of OH—, SH—, $NH_2$—, NHR'—, CN—, $CH=CH_2$—, OCN—, CONHOH—, COOR', acrylamide-, epoxide-, $CH_2=CR''$—COO—, COOH—, $HSO_3$—, $HSO_4$—, $(OH)_2PO$—, $(OH)_2PO_2$—, $(OH)(OR')PO$—, $(OH)(OR')PO_2$—, $SiH_3$—, $Si(OH)_3$—, N—$CH_2$—$PO(OH)_2$—, and —N—$[CH_2-PO(OH)_2]_2$—.

where R' is an alkyl group with 1 to 4 carbon atoms,
where R" is a hydrogen atom or an alkyl group with 1 to 4 carbon atoms.

2. The process of claim 1, wherein X* and Z* are each bound to the group Y* in their terminal positions.

3. The process of claim 1, wherein the metallic surface consists essentially of aluminum, copper, iron, magnesium, zinc or of an alloy containing aluminum, copper, iron, magnesium, silicon and/or zinc.

4. The process of claim 1, wherein compounds of the type XYZ, X*Y*Z* and/or X*Y*Z*Y*X* are able to form self assembling molecules, which molecules are capable of forming a layer, including a monolayer, of assembling molecules on a metallic surface.

5. The process of claim 1, wherein Y or Y* is a linear unbranched group.

6. The process of claim 1, wherein Y or Y* is a linear group branched with one or more alkyl group or aromatic group.

7. The process of claim 1, wherein solution B includes one or more of XYZ, X*Y*Z* and X*Y*Z*Y*X* with a group Y or Y* that has an even number of carbon atoms.

8. The process of claim 1, wherein at least one of XYZ, X*Y*Z* and X*Y*Z*Y*X* is present in the aqueous solution as salt and/or acid.

9. The process of claim 1, wherein solution B includes one or more of XYZ, X*Y*Z* and X*Y*Z*Y*X*, and Y or Y* is an unbranched straight-chain alkyl group with 3 to 30 carbon atoms.

10. The process of claim 1, wherein solution B includes one or more of XYZ, X*Y*Z* and X*Y*Z*Y*X*, and Y or Y* is an unbranched straight-chain group consisting of 1 to 4 aromatic $C_6H_4$ nuclei connected in the para-position, or a group consisting of 1 or 2 unbranched, straight-chain alkyl residues each with 1 to 12 carbon atoms or 1 to 4 aromatic $C_6H_4$ nuclei connected in the para-position.

11. The process of claim 1, wherein solution B includes one or more of XYZ, X*Y*Z* and X*Y*Z*Y*X*, and Y or Y* is an unbranched, straight-chain alkyl group with 6 to 14 carbon atoms or a p-$CH_2$—$C_6H_4$—$CH_2$-group or a p,p'-$C_6H_4$—$C_6H_4$-group.

12. The process of claim 1, wherein solution B includes one or more of XYZ, X*Y*Z* and X*Y*Z*Y*X*, and group $(OH)_2PO_2$— or $(OH)(OR')PO_2$— as X or X*.

13. The process of claim 1, wherein solution B includes one or more XYZ, X*Y*Z* and X*Y*Z*Y*X* with a group $(OH)_2PO_2$—, $(OH)(OR')PO_2$—, OH—, SH—, NHR'—, CH=$CH_2$ or $CH_2$=CR"—COO— as Z or Z*.

14. The process of claim 1, wherein XYZ, X*Y*Z* and/or X*Y*Z*Y*X* are in an aqueous solution containing at least one compound selected from the group consisting of 1-phosphonic acid-1 2-mercaptododecane,
1-phosphonic acid-12-(N-ethylamino)dodecane,
1-phosphonic acid-12-dodecene,
p-xylene diphosphonic acid,
1,10-decanediphosphonic acid,
1,12-dodecanediphosphonic acid,
1,14-tetradecanediphosphonic acid,
1-phosphoric acid-12-hydroxydodecane,
1-phosphoric acid-12-(N-ethylamino)dodecane,
1-phosphoric acid-12-dodecene,
1-phosphoric acid-12-mercaptododecane,
1,10-decanediphosphoric acid,
1,12-dodecanediphosphoric acid,
1,14-tetradecanediphosphoric acid,
p,p'-biphenyldiphosphoric acid,
1-phosphoric acid-12-acryloyldodecane,
1,8-octanediphosphonic acid,
1,6-hexanediphosphonic acid,
1,4-butanediphosphonic acid,
1,8-octanediphosphoric acid,
1,6-hexanediphosphoric acid,
1,4-butanediphosphoric acid,
aminetrimethyleneposphonic acid,
ethylenediaminetetramethylenephosphonic acid,
hexamethylenediaminetetramethylenephosphonic acid,
diethylenetriaminepentamethylenephosphonic acid and
2-phosphonobutane-1,2,4-tricarboxylic acid.

15. The process of claim 1, wherein the metallic surfaces are contacted with the solution A in the time range of from 0.001 seconds to 10 minutes.

16. The process of claim 1, wherein the pH value of the solution A is in the range of from 0.5 to 6.

17. The process of claim 1, wherein in solution A the concentration of the chemical elements selected from the group of titanium, zirconium, hafnium, silicon and boron is in the range of from 0.0001 to 0.2% by weight.

18. The process of claim 1, wherein in solution A the concentration of the zirconium, if present, is in the range of from 0.0001 to 0.1% by weight, the concentration of the titanium, if present, is in the range of from 0.0001 to 0.1% by weight, and wherein only one of titanium and zirconium must be present.

19. The process of claim 1, wherein in solution A the concentration of the total fluoride is in the range of from 0.001 to 0.2% by weight calculated as fluoride.

20. The process of claim 1, wherein a coating comprising solution A, solution B, or a combination of both solution A and solution B, is generated having a coating weight measurable by X-ray spectroscopy.

21. The process of claim 1, wherein the metallic surface is contacted with the solution A, or with the solution B, or with both, by dipping, immersing, roll-coating, squeegeeing or spraying.

22. The process of claim 1, wherein the time of contacting the metallic surfaces with the solution B is 0.5 second to 10 minutes.

23. The process of claim 1, wherein the pH value of solution B is in the range of from 1 to 10.

24. The process of claim 1, wherein one or both aqueous solutions contain a proportion of an organic solvent.

25. The process of claim 1, wherein before applying the first aqueous solution, the metallic surface is subject to one or more of cleaning, degreasing, pickling and pre-annealing.

26. The process of claim 1, wherein there is at least one additional step of rinsing the metal surface with water.

27. The process of claim 1, wherein there is an additional step of rinsing between contacting the metallic surface with solution A and contacting the surface with solution B.

28. The process of claim 1, wherein either the coated metallic surface is dried, the excess liquid is blown away, or both, after having been coated with solution B.

29. The process of claim 1, wherein the metallic surface coated with solutions A and B are then coated with one or more of a lacquer, a paint, an adhesive, an after rinse, a sealant, a rubber and an organic material.

30. The process of claim 1, wherein the metallic surface is coated with a multilayer of at least 3 layers by alternately applying solutions A and B.

31. The process of claim 1, wherein a metallic surface of castings, extruded parts, forgings, frames, housings, profiles, sheet stock, stampings, strips, wheels, wires, parts for aircraft industry, for automobile industry, for beverage or other containers, for construction or for mechanical engineering is treated.

* * * * *